United States Patent [19]

Drews

[11] 4,284,302
[45] Aug. 18, 1981

[54] DRIVEN CRAFT HAVING SURFACE MEANS FOR INCREASING PROPULSION EFFICIENCIES

[76] Inventor: Hilbert F. P. Drews, 5640 S. 76th St., Greendale, Wis. 53129

[21] Appl. No.: 47,302

[22] Filed: Jun. 11, 1979

[51] Int. Cl.³ .......................... B64C 1/38; B62D 35/00
[52] U.S. Cl. .................................. 296/1 S; 244/130; 296/193; 296/91
[58] Field of Search ............... 296/1 R, 1 S, 193, 194, 296/195, 31 R, 91; 244/198, 200, 130

[56] References Cited

U.S. PATENT DOCUMENTS

| | | | |
|---|---|---|---|
| 2,683,498 | 7/1954 | Schaack | 180/69 R |
| 4,119,339 | 10/1978 | Heimburger | 296/1 S |
| 4,180,290 | 12/1979 | Drews | 296/1 S |

Primary Examiner—John P. Silverstrim
Assistant Examiner—John A. Carroll
Attorney, Agent, or Firm—Andrus, Sceales, Starke & Sawall

[57] ABSTRACT

The exterior surfaces of an automobile is formed with a series of immediately adjacent or closely spaced wave-shaped flutes which extend longitudinally at an angle to the direction of travel and form a herringbone pattern. A series of parallel dividing walls extending in the direction of forward vehicular travel are integrally formed with the fluted surface. The dividing walls in one embodiment include trailing tapered projections slightly above the plane of flutes. The base of the flutes may have smaller rearwardly inclined pin-like projections to optimize air action within the flutes. In another embodiment, the curved or fluted member are shaped as feathered members with a plurality of parallel dividing walls for channelling the air.

14 Claims, 16 Drawing Figures

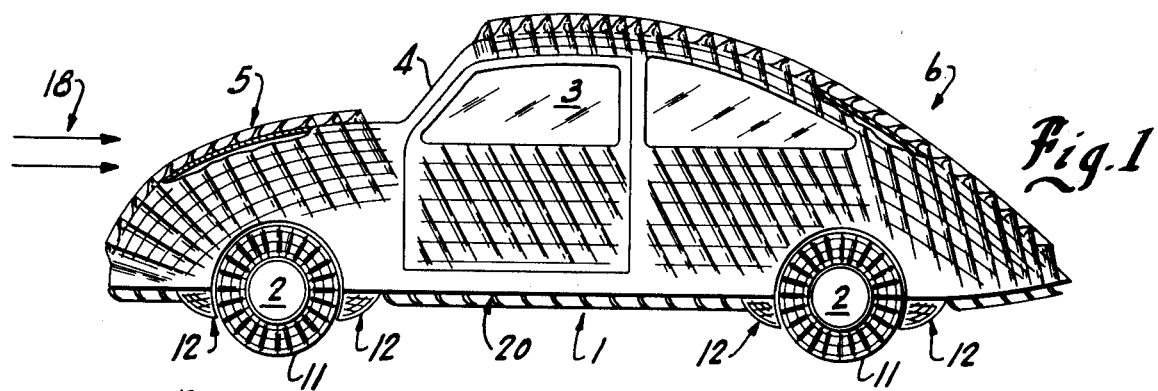
Fig. 1
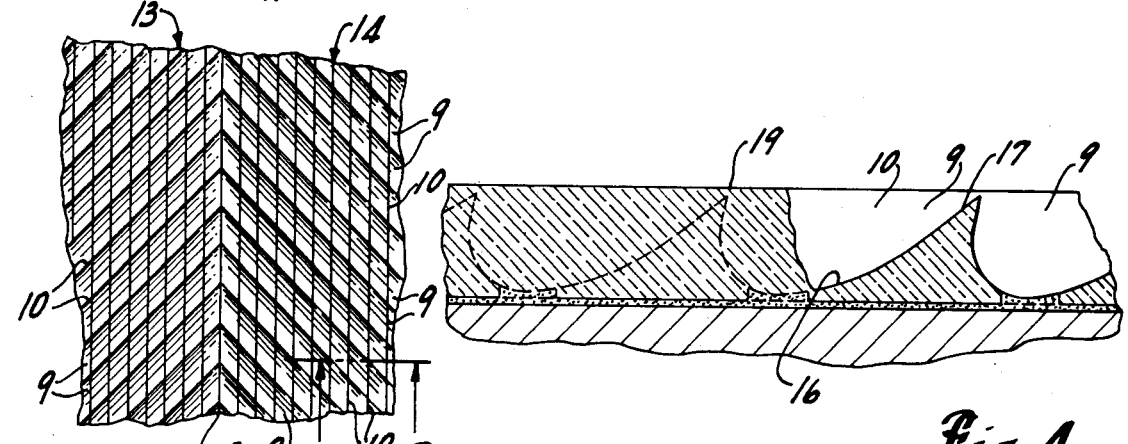
Fig. 2  Fig. 4
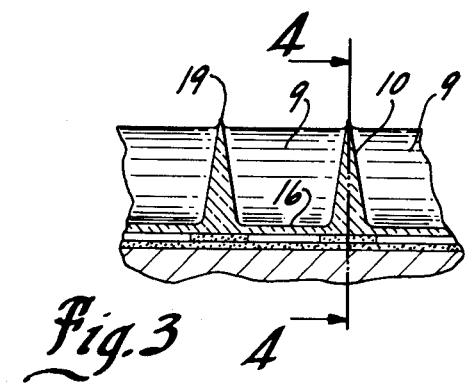
Fig. 3
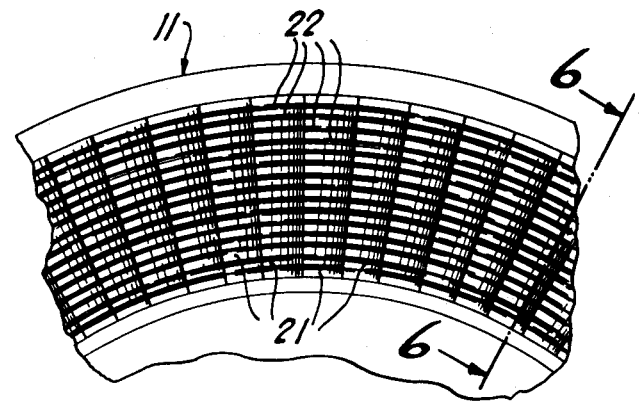
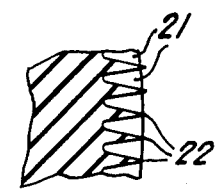
Fig. 6
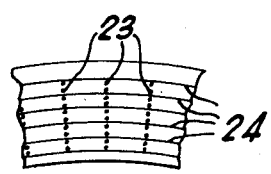
Fig. 7
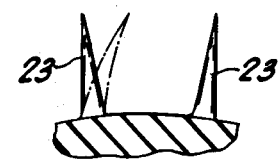
Fig. 8

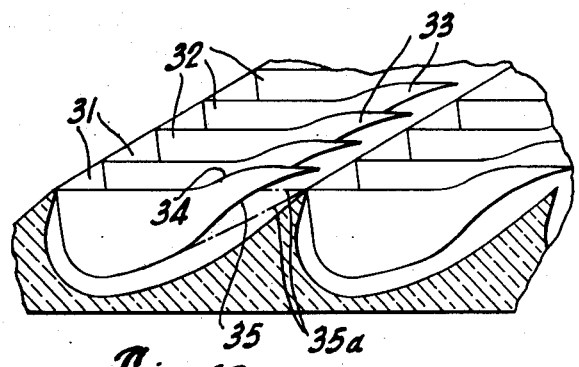
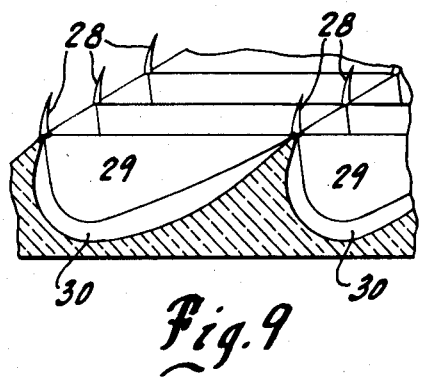
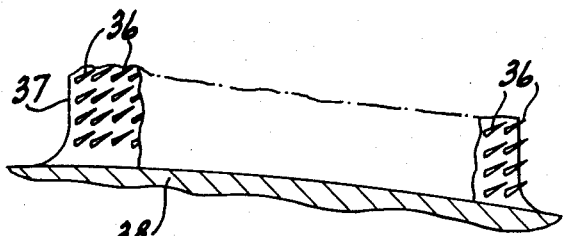
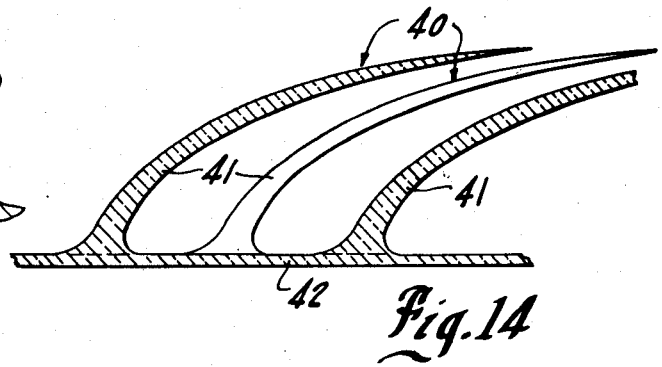
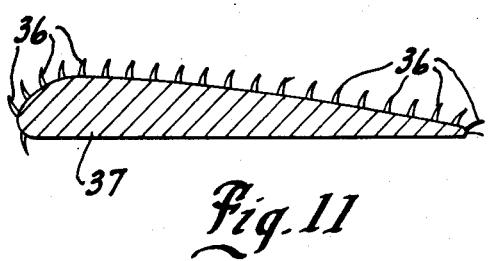
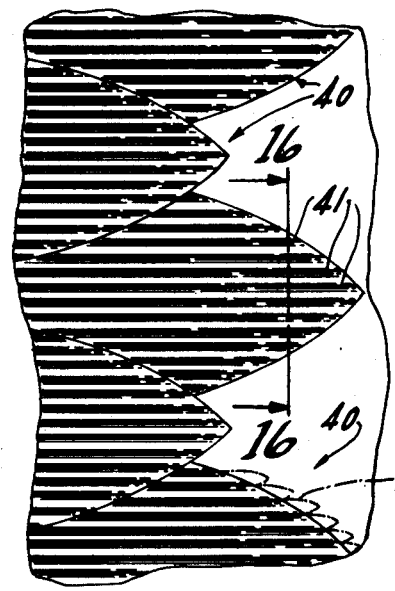
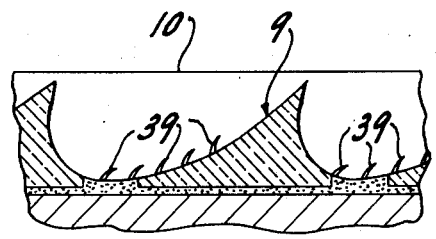
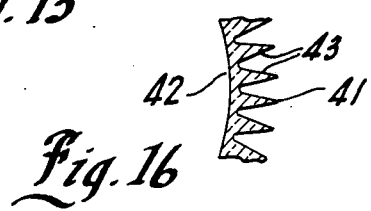

DRIVEN CRAFT HAVING SURFACE MEANS FOR INCREASING PROPULSION EFFICIENCIES

BACKGROUND OF THE INVENTION

The present invention relates to vehicles having surface means for developing increased propulsion efficiency by reducing of opposing forces acting on the vehicle.

As disclosed in the inventors copending application entitled PROPELLED APPARATUS HAVING SURFACE MEANS FOR DEVELOPING INCREASED PROPULSION EFFICIENCIES which was filed on May 16, 1977 with Ser. No. 798,417 development of different crafts for land, air and water transport, significant effort has been directed toward the streamlining of the body. Thus, generally it is assumed that the movement of the craft through the air or water requires the movement of the medium over the surface. Streamlined leading surfaces are provided for gradually moving of the air or water laterally aside to minimize the build up of a compacted mass of the fluid. The forward wall does, of course, because of impacting or smaching into the medium, develop a relatively forward compacted mass and opposing pressure, with the streamlined angular orientation of smooth surfaces providing for the mass to slip off the vehicle's surface and rearwardly from the vehicle. This, however, does result in the medium being carried along the surface and thereby creating a drag characteristic. Further, it is well known in the art particularly as applies to land vehicles and the like, the movement of the compacted mass results in the creation of a reduced pressure at rear end of the moving vehicle. This, of course, in essence creates further drag on the vehicle tending to prevent the forward propulsion and further creating a source of inefficiency.

Although streamlined surfaces have been widely developed, and do in fact contribute to improved efficiency, the present inventor has realized that the prior art approach is only directed toward reducing the effect of the impact forces.

As more fully detailed in the copending application, curved surfaces generally of a wave-shaped configuration are formed on the vehicle with the crest and trough arranged for developing minimum pressure conditions into which the craft moves and/or developing maximum trailing pressure conditions so as to avoid the drag characteristics generally inherent in the craft's movement. Generally, the exterior surface of the craft was provided with a series of parallel and minute wave-shaped flutes extending perpendicular to the direction of travel so as to create movement of the air over the vehicle with a minimum of friction and drag forces.

The fluted surface to the rear of the vehicle was provided with a screen means to accumulate and maximize the air pressure condition to the rear of the craft and thereby enhance the forward propulsion of the vehicle.

Each flute is generally wave-shaped and includes a trough which extends upwardly and rearwardly to a relatively sharp crest and then breaks downwardly and forwardly into the next trough. Small flutes tend to direct the air upwardly and over the crest with a vortex or swirling air pocket within each trough such that the impacting air engages with the vehicle surface only at the flute crest portions and thus with a reduced friction or drag.

Applicant analysis has further indicated that the fluted type surface can be developed to enhance the relative air movement created by the vehicle to generate desirable airflow with respect to the vehicle surfaces to further minimize the conventional retarding forces on the craft.

SUMMARY OF THE INVENTION

A driven craft such as an automobile, aircraft boat or the like has its exterior walls including a substantial plurality of adjacent parallel wave-shaped grooves or flutes which extend rearwardly at a selected angle to the forward direction of movement. A plurality of channel walls extend through said flutes parallel to the forward direction of movement. The channel walls may have a trailing feather-shaped end which curves rearwardly and outwardly of each flute, and a plurality of tapered projections may be secured to the junctions of the channel walls and the crest of said flutes. The wave-shaped flutes may be formed by a plurality of closely tapered projections which extend upwardly and rearwardly with a progressively reduced cross-section. In a land vehicle the tires are formed with circumferentially spaced wave-shaped fluted surface with the flutes extending radially. Annular channel walls extend through said fluted surface. The fluid directing surface may include a plurality of rows of curved feather-shaped members with successive rows overlapping offset. Each feather member extends rearwardly in a continuously curved configuration to an outer tapered tip and each member has a plurality of longitudinally extended channel walls.

The present invention thus extends the concept of the treatment of the total surface of an element or device which moves through a fluid medium to maximize the interaction with the medium caused by the movement of the element or device, as well as with the cross-current flows due to the separate movement of the medium. Thus, an automobile, aircraft or the like may encounter cross-winds and the like which tend to move over the forward or windward surfaces and curl back onto the lee surfaces. The surface treatment will tend to utilize such eddies or currents as well as properly minimizing the frictional forces on the vehicle.

DESCRIPTION OF THE DRAWING FIGURES

The drawings furnished herewith illustrate a preferred construction of the present invention in which the above advantages and features are clearly disclosed as well as others which will be clear from the following description of such embodiments.

In the drawings:

FIG. 1 is a side elevational view of an automobile incorporating the present invention;

FIG. 2 is a fragmentary plan view of the forward portion of the vehicle;

FIG. 3 is an enlarged vertical section taken generally on line 3—3 of FIG. 2;

FIG. 4 is an enlarged fragmentary vertical section taken generally on line 4—4 of FIG. 2, and with parts broken away to more clearly illustrate certain detail of construction;

FIG. 5 is an enlarged fragmentary plan view of a tire shown in FIG. 1;

FIG. 6 is a fragmentary sectional view taken generally on lines 6—6 of FIG. 5;

FIG. 7 is a fragmentary view similar to FIG. 5 and showing an alternate tire sidewall structure;

FIG. 8 is partial section taken generally on line 8—8 of FIG. 7;

FIG. 9 is a fragmentary view similar to FIG. 4 illustrating a further modified embodiment of the invention;

FIG. 10 is a fragmentary pictorial illustrating a further modification of the present invention as shown in FIG. 104;

FIG. 11 is a sectional view through an aircraft wing structure and illustrating a further service treatment and structure;

FIG. 12 is a vertical section taken generally on line 12—12 of FIG. 11;

FIG. 13 is a view similar to FIG. 4 showing still a further modification to the flute surface;

FIG. 14 is a sectional view illustrating still a further vehicle surface treatment employing air channelling in a curved wall member;

FIG. 15 is a plan fragmentary view of the structure shown in FIG. 14; and

FIG. 16 is a fragmentary sectional view taken generally on line 16—16 of FIG. 15.

DESCRIPTION OF THE ILLUSTRATED EMBODIMENT

Referring to the drawings and particularly to FIG. 1, a conventional automobile is diagrammatically illustrated including a body portion 1 mounted on wheels 2. The illustrated body portion 1 includes a central passenger compartment 3 with a front windshield 4 and forwardly extended streamlined hood portion 5 within which the engine (not shown) is housed. The rear or trunk portion 6 of the automobile extends rearwardly from the passenger compartment and is shown of the hatch-back type configuration. The vehicle's exterior surface is in accordance with one embodiment of the present invention, formed as a unique fluted surface which includes specially arranged individual parallel flutes 9 and intersecting dividing walls 10 to minimize the effective area of impact with air in front of the vehicle and to minimize the retarding forces associated with the air moving over the top side and rear surfaces of the vehicle. In the illustrated embodiment of the present invention, all exterior surfaces including not only the upper surfaces but also the bottom and sides of the automobile 1 as well as the wheel tires 11 may be similarly formed of the divided fluted surfaces as hereinafter described to enhance the effects of the environmental air conditions. In addition, fluted members 12 may be located to the front and back of the tires 11 to further minimize tire drag normally encountered.

As fully developed in the inventor's copending application, the conventional approach employing a relatively smooth, streamlined body surface, although providing improved efficiencies, does not maximize the effective conditions, and in fact that rather than a smooth surface, a surface with the series of generally wave-shaped flutes provides an improved surface for reducing of the opposing forces on the vehicle. Generally, in that teaching the surface included relatively minute surface flutes extending normal to the direction of travel and operating to minimize resistance to forward movement and maximize resistance to the forward movement and maximize the pressure conditions to the rear of the vehicle thereby maintaining optimum propulsion conditions. The basic concept disclosed therein is partially employed herein. In the drawings, the flutes are shown very substantially enlarged for purposes of illustration.

Referring particularly to FIGS. 3 and 4, an enlarged fragmentary view of the top or trailing portion of the vehicle 1 shown in FIG. 1 is illustrated. As shown therein, the fluted surface includes a first series of wave-shaped flutes 13 and a second series of wave flutes 14 arranged in a herringbone pattern. Each series of the flutes 13 and 14 is angularly oriented in an opposite direction with respect to the forward direction of travel and extends from a central portion as shown by line 15 of the vehicle 1 laterally and rearwardly. Each series of flutes 13 and 14 includes a plurality of similar individual flutes 9. Each flute 9 includes a depression or trough 16 which progressively moves and curves upwardly and rearwardly to a sharp crest 17 merging with the next trough as in the previously identified application.

The same flute pattern extends over the curved surface of the hood portion 5 with the peaks or crest 17 of each flute 9 correspondingly positioned rearwardly and upwardly from the previous crest 17. As a result of the vonfiguration, the movement of the incoming air mass 18, resulting from the relative movement of the vehicle tends to move into the trough 16 of each flute 9 engaging the rising portion to the crest of the flute 9 and moving upwardly over the crest. The movement of the air mass 18 appears to generate small vortex motions within the wave troughs 16 to reduce the atmospheric and/or air pressure within the trough of each flute. The flutes 9 also successively directs the air upwardly and thus acts as minute screen generatores which minize the build-up of impact pressures and establish a minimal resistance to the movement of the vehicle as shown in the previously identified application.

The herringbone pattern will tend to properly direct the air away from the vehicle 1 while maintaining the minimal solid pmpact area as the vehicle moves through the environment.

In addition to the herringbone pattern of the fluted wall surface, the plurality of generally parallel/dividing wall 10 are provided extending substantially in the direction of travel and thus cutting across the several flutes 9 as most clearly shown in FIGS. 1-4. The dividing walls are to be substantially parallel to the direction of forward craft movement and are therefore angularly oriented with respect to the angulated fluted portions 13 and 14. The wave-shape flutes 9 and dividing wall 10 interact in a manner to direct the vortexing air towards the leading central portion of the angulated flutes and tend to concentrate the forces within the surface to further enhance the proper interaction within the fluted portion to maximize forward propulsion forces. The dividing wall 10 may be formed as simple integral wall structures interconnected with the molded fluted wall.

The wall 10 may be formed with a simple conical cross-section, as shown most clearly in FIG. 3, with the uppermost ends extended slightly above the plane of the flutes 9 as at 19 to clearly separate and define the enhancement chambers, as most clearly shown in FIGS. 2 and 4.

The fluted wall surfaces are preferably similarly formed or provided on all exterior portions of the vehicle. Thus, the front or forward hood portion 5 can be formed with the angulated fluted surfaces extending over the front wall thereof. Similarly, the underside of the vehicle is preferably provided with a bottom cover panel 29 having the exterior fluted surface for similarly directing of the air to minimize friction and drag forces while maximizing the air generated forces. The bottom panel 20 may of course be provided with the necessary openings for servicing air movement and the like. The angulated fluted members or the vehicle's sidewall may extend in a single angulated direction rather than in a herringbone pattern, as shown.

In addition, the curved wall members 12 have fluted surfaces and are mounted to the front and rear of each automobile wheels to eliminate the flat, peripheral wall of the tires. The shaped members are particularly formed with a similar fluted and divided configuration.

In addition, in the illustrated embodiment of the invention, the tires 11 may be advantageously formed with similarly treated sidewalls. The tires, which are formed of molded rubber, may be constructed with the desired configuration integrally molded into the sidewalls, as shown for example in FIGS. 5 and 6.

Referring to FIG. 5, a fragmentary portion of the side wall of a tire 11 is shown with a plurality of radially directed flutes 21 which extend substantially radially of the wheel axle. The flutes 21 are again divided by a plurality of closely spaced, angular dividing walls 22 which may project slightly above the level of the flutes if so desired.

Further, the windows may be treated with a pattern such as shown in FIG. 2. Thread-like elements which are of a black light absorbing character to minimize any significant interference with the ability to see through the windows and particularly the windshield.

Thus, as shown in FIGS. 1–4, the surface of the vehicle or other device being treated is preferably totally treated to minimize fluid friction and drag on the vehicle by presenting minimal air to surface contact and to maximize the interaction between the air currents and the surface and thereby increase the efficiency of movement of the craft. The illustration of course shows the fluted members quite large whereas it is contemplated that very minute depths would be used as discussed in the previously identified application.

Although the fluted surface can of course be formed in any desired manner, it is advantageously formed and applied as a separate foil-like cover member which is laminated to or otherwise secured to the vehicle by an adhesive as shown in inventors copending application. The cover member may be formed of any suitable material. A fiberglass material, because of its heat assistance may be desirable in certain uses. Plastics such as those sold under the trademark Nylon and Teflon because of the low friction coefficients, may be desirable. A foil-like cover member may have the flutes 9 and walls 10 integrally formed with a continuous base sheet 37 adapted to be adhesively secured in place.

Further, although shown in FIGS. 1–4 as particularly applied to an automotive vehicle, the same surface treatment may be applied to any article moving through a field. Thus, the surface of fan blades, propellers as well as various other driven air water vehicles and crafts may employ the surface configuration of this invention. The surface treatment may also be advantageously applied to air moving duct work and the like, wherein the usual flat surfaces create frictional drag on the fluid movement.

The properties of the fluid, such as the viscosity, expansion and cohesiveness, as well as the speed of the element may affect the particular shape and size of the surface configurations. Thus, in air where the vehicle may approach very high speeds, relatively small, fine members may have a drammatic and noticeable interaction. In a medium such as water, the several elements may have to be of a somewhat more substantial structured character to the interact with the force of the fluid medium.

The herringbone pattern and other angulated orientation of the parallel flutes will tend to divert the air and function as a wedge diverting means, while the channeling wall will contain the moving air within the surface to maintain the maximum effect of the fluted surfaces. The aft or trunk portion of the automobile with the novel fluted surfaces, particularly minimize the reduction in pressure on the rearward surface of the vehicle as normally encountered in conventional construction, particularly at high speed. The channel fluted surface developed by the wave-shaped flutes functions such that the atmospheric pressure conditions on the rearward surfaces of the vehicle can be increased or maximized so as to significantly eliminate the normal drag created by movement of the vehicle through the air. The channelling walls serve to increase the sustained atmospheric or fluid pressure on the rear surface of the vehicle and thereby further enhances the overall propulsion efficiency. Small vortex motions are generated within the flutes 9 which are confined by the channelling walls 10 and directed to the center for creating a pressure enhancement action. The channel and angled fluted surface is apparently well suited to take advantage of the turbulence present at the back of a vehicle to maximize pressure conditions on the rearward surfaces and the vehicle. Generally, the action may be further enhanced by a plurality of laterally extending upwardly curving vanes, not shown, such as discussed in the above identified copending application.

A modification to the tire structure may be provided as shown for example as shown in FIGS. 7 and 8.

In FIG. 7, the flutes are shown formed from a plurality of aligned small individual projections or finger members 23. Each of the finger members 23 is illustrated, most clearly in FIG. 8, as a conically shaped member having a relatively large round base molded to the sidewall body of the tire and projecting horizontally outwardly therefrom with the outermost end of the projections in a common plane. As the wheel rotates the finger member 28 tend to deflect backwardly generally forming a curved, wave-shaped portion, and in combination define the fluted portion. Annular dividing walls 24 may of course be integrally formed with the tire to form the same radially spaced walls extended through the fluted portion.

As a further embodiment, the finger structure of the embodiments shown in FIGS. 7 and 8 may be combined fluted surfaces such as shown in FIGS. 1–4. Thus, referring particularly to FIG. 9, finger members 24 affixed at each intersection of a flute crest 25 of flutes 26 and a dividing wall 27. In this embodiment, the conically shaped fingers 24 form small wave-shaped portions extended over the dividing wall 27 to further separate the small chambers defined by the interaction between the angulated flutes 26 and the dividing walls 27.

A further embodiment of the invention as applied to the surface of vehicle is illustrated in FIG. 9. In this embodiment of the invention, the fluted wall is again preferably formed in a herringbone pattern similar to that shown in FIGS. 1–4 with the angularly related dividing walls which extend in the direction of travel. In this embodiment small finger members 28 are attached at the intersections of each dividing wall 29 and the crest of a flute 30. The finger members 28 may be conical members which are wave-shaped or if formed of a flexible material may deflect to form a generally wave-shaped member overlying the dividing wall 29. A similar structure may be formed by appropriate molding of the dividing wall for example as shown in FIG. 10, which is another view similar to FIGS. 4 and 9.

In FIG. 10, the surface is again formed with the parallel flutes 31 and dividing walls 32. However, the trailing portion of each wall 32 is specially shaped within the flute to curve upwardly and rearwardly in the manner of a featherlike member to an outer point, as at 33.

The dividing wall can be molded into the plastic covered wall with the trailing end specially formed with an upper edge 34 which curves upwardly and rearwardly to the feathered end. The bottom portion or edge 35 of the wall 32 is integrally formed with the trough of the fluted member at the forward and base portion of the flute and then curves upwardly and rearwardly out of the trough to form the bottom edge of the tapered member.

As an alternative to such a construction, the bottom edge 35 may extend as a continuous inner wall as in FIG. 4 which is cut back from the crest of the next flute to form the tapered projection, as shown in phantom FIG. 10, or at 35a.

The closely spaced and flute forming projections or fingers may also be advantageously applied to other craft surfaces, such for example as an aircraft wing, as shown in a simplified pictorial view in FIGS. 11 and 12. Thus, in this embodiment finger members 36 are affixed to the surface of wing 37. The finger members 36 are shaped to extend away from the wing surface and rearwardly as to define the elongated flute surfaces and may of course be offset to define an elongated flute which extends rearwardly such as in the illustrated embodiment of FIGS. 1–4. Finger members 36 may be applied to the trailing end of the member such as the wing and project therefrom to disperse the air pressure and minimize the tendancy to create a vacuum pressure condition tending to create a holding force on the wing or other craft surface.

In addition, the individual finger members 36 may be directed or extend laterally outwardly toward the outer end tip of the wing and thus away from the body 38 of the aircraft, as shown in FIG. 12. This feature would be particularly applicable to the finger members on the leading edge of wing, as shown in FIG. 12. Thus, the finger members with the outer spacing may also serve to direct air outwardly to disperse the air pressure and therefore reduce the drag created by the movement through the air. In addition, a continuous waveshape member may be interspersed among the row of conical rearward facing members.

Still a further variation of a fluted covered surface similar to that shown in FIG. 4 is illustrated in FIG. 13. In addition to the previous modifications, shaped fingerlike members 39 may be located within the base portion of the flute trough. In this manner the vortexing air in the bottom portion of the trough is captured for further enhancement of the air action on the surface.

An alternate embodiment of the invention for producing air capturing and directing configuration is further illustrated in FIGS. 14–16 in which an outer tapered construction is used. This structure appears to be particularly suited for marine craft. Referring particularly to FIGS. 14 and 16, the surface of the exterior of the craft is formed or covered with parallel rows 40 of generally tapered members or units 41 with immediately adjacent succeeding rows staggered or offset to space the tapered members 41 by one-half of the width thereof, as most clearly shown in FIG. 16. Each of the tapered units 41 may be constructed as an integral molded element interconnected to a base portion 42 and extending upwardly and rearwardly therefrom. As shown in FIG. 14, each tapered member 41 has a tapered cross-section with a relatively large connecting portion at base 42 and having a progressively reduced cross-section to a relatively thin flexible outer end or tip. The outer portion of each member 40 extends over the base portion of the next two adjacent rows. Each unit 41, as viewed in the plan view of FIG. 15, also tapers from the base portion to the outermost tip. The outer surface configuration of the feather member 41 includes a plurality of channel forming walls 43 which extend parallel to each other and form channels extended in the direction of the motion, generally similar to the channel walls of the first embodiments. The outermost tip portion may also be formed with similarly tapered feather-like extensions, as shown in phantom at 44.

Once again the motion of the device through the air or water results in a similar interaction between the surfaces and the impacting air to properly disperse the air in the pressure conditions while minimizing the surface interengagement with the air.

As noted previously, the various surface elements have been illustrated of a size to clearly show the preferred shapes and relationship of parts. The elements as shown may be enlarged when compared to practical implementation. For example, the fluted members and projections on the order of 1/16 to ⅛ inch may provide the desired interaction. The size may even be significantly smaller and in some cases may advantageously be microscopic. However, size is not considered critical, but will normally be as small as practical to produce the desired interaction.

Various modes in carrying out the invention are contemplated as being within the scope of the following claims, particularly pointing out and distinctly claiming the subject matter which is regarded as the invention.

I claim:

1. A driven craft adapted to be moved through a fluid and having an exterior wall means, said wall means of the craft defining fluid engaging surfaces, said wall means creating frictional engagement with the medium, said wall means including a substantial plurality of adjacent parallel wave-shaped flutes, each of said flutes extending rearwardly along said surface at a selected inclusive angle substantially less than ninety degrees to the forward direction of craft movement, the cross-section of each of said flutes having a trough portion extending upwardly and rearwardly to a crest portion developing an outwardly flowing air stream, and having a plurality of channelling walls extending through said flutes, said channelling walls extending substantially parallel to the forward direction of craft movement.

2. The craft of claim 1 wherein each of said channelling walls includes a trailing feather-shaped end which is curved rearwardly and outwardly of the wave-shaped flute.

3. The craft of claim 1 wherein a plurality of tapered finger-like members are secured within the flutes, said finger-like members extending rearwardly and upwardly within the base portion of the flutes and operable to trap air pressure within the flutes.

4. The craft of claim 1 wherein a plurality of small finger-like members are secured to the crest of said flutes and extend rearwardly.

5. The craft of claim 1 wherein said channel walls extend substantially throughout the total depth of the wave-shaped flutes and slightly above the crest of each flute.

6. The craft of claim 1 having a rear trailing tapered wall portion, and including a plurality of rearwardly and upwardly opening finger members defining a generally wave-shaped extension of said wall portion to disperse the atmospheric pressure adjacent said trailing wall portion.

7. The craft of claim 1 including a plurality of vertical tapered finger-like members secured to the crest portion and longitudinally spaced along the length of the flute member.

8. The craft of claim 1 including a plurality of supporting wheels having tires, said tires having sidewalls formed with circumferentially spaced wave-shaped fluted surface with the flutes extending generally radially of the wheel and having annular channelling walls extended through said fluted surface for minimizing the frictional drag.

9. In a driven vehicle adapted to move forwardly through a fluid medium, said body having a wall means moving through and parting the medium as the body moves through the medium, a fluid directing means for capturing and directing of the fluid and including a plurality of rows of curved tapered feather-shaped members and said feather-shaped members in successive rows being offset by substantially one-half the width of said members, each of said feather-shaped member having a base portion affixed as a part of the wall and extending rearwardly in a continuously curved configuration to an outer tapered tip, each of said members having a plurality of longitudinally extended channel walls.

10. The vehicle of claim 9 wherein said members in adjacent rows overlap.

11. The vehicle of claim 9 wherein said channel walls having a tapered cross-section.

12. The vehicles of claim 9 wherein each of said feather-shaped member is a single integral member having said channel walls formed in the top surface of the member.

13. The vehicle of claim 9 wherein said feather-shaped members deflect toward the vehicle in response to forward movement of the vehicle.

14. In a driven vehicle adapted to move forwardly through a fluid medium, said body having a wall means moving through and parting the medium as the body moves through the medium, a fluid directing means for capturing and directing of the fluid and including a plurality of curved tapered pin-like members substantially covering said wall, each of said pin-like members having a base portion affixed as a part of the wall and extending rearwardly to an outer tapered tip, each of said members being flexible and deflecting rearwardly and downwardly in response to forward movement of the vehicle.

* * * * *